United States Patent
Rong et al.

(10) Patent No.: US 8,855,317 B2
(45) Date of Patent: Oct. 7, 2014

(54) SYSTEM FOR PROTECTING AN ENCRYPTED INFORMATION UNIT

(75) Inventors: Chunming Rong, Stavanger (NO); Gansen Zhao, Guangzhou (CN)

(73) Assignee: Universitetet i Stavanger, Stavanger (NO)

( * ) Notice: Subject to any disclaimer, the term of this patent is extended or adjusted under 35 U.S.C. 154(b) by 0 days.

(21) Appl. No.: 13/504,244

(22) PCT Filed: Oct. 28, 2010

(86) PCT No.: PCT/EP2010/066386
§ 371 (c)(1),
(2), (4) Date: Jul. 11, 2012

(87) PCT Pub. No.: WO2011/051400
PCT Pub. Date: May 5, 2011

(65) Prior Publication Data
US 2012/0269348 A1 Oct. 25, 2012

Related U.S. Application Data

(60) Provisional application No. 61/405,302, filed on Oct. 21, 2010.

(30) Foreign Application Priority Data

Oct. 30, 2009 (NO) .................................. 20093259

(51) Int. Cl.
*H04L 29/06* (2006.01)
*H04L 9/08* (2006.01)
*G06F 21/62* (2013.01)
*H04L 9/30* (2006.01)
*H04L 9/32* (2006.01)

(52) U.S. Cl.
CPC .......... *H04L 9/0836* (2013.01); *G06F 21/6218* (2013.01); *H04L 9/3066* (2013.01); *H04L 9/32* (2013.01)
USPC ............. 380/278; 380/28; 380/279; 713/156; 713/160; 713/161

(58) Field of Classification Search
CPC ........................................................ H04L 9/32
USPC ........................... 380/200–242, 28, 278, 279; 713/150–181
See application file for complete search history.

(56) References Cited

U.S. PATENT DOCUMENTS

2004/0215661 A1* 10/2004 Zhang et al. ................ 707/104.1
2006/0012713 A1 1/2006 Kim et al.
(Continued)

FOREIGN PATENT DOCUMENTS

EP 2124381 A1 11/2009
WO WO-2008/151540 A1 12/2008

OTHER PUBLICATIONS

Mezödi, Stephan, "International Search Report" for PCT/EP2010/066386, as mailed Jan. 20, 2011, 4 pages.

(Continued)

*Primary Examiner* — Kambiz Zand
*Assistant Examiner* — Don Zhao
(74) *Attorney, Agent, or Firm* — Young & Thompson

(57) ABSTRACT

This invention relates to system for securing an information unit and applications thereof. The system comprising at least one encrypting means for applying a first encryption key to the information unit thus provided an encrypted information unit, wherein said at least one encryption means is adapted to apply at least two second information encryption keys to the encrypted information unit, said at least two second encryption keys being calculated so as to decrypt the encrypted information unit when all of said first and second encryption keys have been applied to the information unit, the encryption keys being distributed to chosen users of the system.

4 Claims, 3 Drawing Sheets

(56) References Cited

U.S. PATENT DOCUMENTS

| | | | |
|---|---|---|---|
| 2006/0182283 A1 | 8/2006 | Sandhu et al. | |
| 2006/0212713 A1 | 9/2006 | Hatakeda | |
| 2007/0192602 A1* | 8/2007 | Blom et al. | 713/169 |
| 2009/0048979 A1* | 2/2009 | Al-Herz et al. | 705/67 |
| 2009/0116649 A1 | 5/2009 | Perlman | |
| 2009/0249060 A1* | 10/2009 | Dossett et al. | 713/156 |
| 2010/0017593 A1* | 1/2010 | Putz | 713/150 |

OTHER PUBLICATIONS

Boyd, Colin, "Digital Multisignatures", Proceedings of a conference organized by the Institute of Mathematics and its applications on Cryptography and Coding, 1989, pp. 241-246.

Russell, Selwyn "Multisignature algorithms for ISO 9796", ACM Sigsac Review, vol. 15, No. 1, Jan. 1997, pp. 11-14.

Menezes, A et al, "Handbook of Applied Cryptography, Public-Key Encryption", Handbook of Applied Cryptography; [CRC Press Series on Discrete Mathematics and Its Applications], CRC Press, Jan. 1, 1997, pp. 285-286, 294-297, 524-525.

Zhao, Gansen et al, "Distributed Key Management for secure Role based Messaging", In Proceeding of the IEEE 20th International Conference on Advanced Information Networking and Applications (AINA2006), Apr. 2006, 6 pages.

Shamir, Adi, "How to Share a Secret", ACM, vol. 22, No. 11, Nov. 1979, pp. 612-613.

Hoffman, P., RFC 2634—Enhanced Security Services for S/MIME. Request for Comment, Network Working Group, Jun. 1999, pp. 1-58.

International Organization for Standardization. ISO/TEC 18033-3 Encryption algorithms—Part 3: Block ciphers, 2005, 7 pages.

National Institute of Standards and Technology. NIST Special Publication 800-67 v1.1: Recommendation for the Triple Data Encryption Algorithm (TDEA) Block Cipher, May 2008, 40 pages.

Ramsdell, B., RFC 3851—Secure/Multipurpose Internet Mail Extensions (S/MIME) Version 3.1 Message Specification. Request for Comment, Network Working Group, Jul. 2004, pp. 1-36.

Bellare, M. et al., "Incremental Cryptography: The case of Hashing and Signing", Advances in Cryptology-Crypto 94 Proceedings, LNCS, 839, Springer-Verlag Berlin Heidelberg,1994, pp. 216-233.

Bellare, M. et al., "Incremental Cryptography and Application to Virus Protection", Proceedings of the 27th ACM Symposium on the Theory of Computing, May 1995, 15 pages.

American National Standard for Financial Services, "ANS X9.52-1998 Triple Data Encryption Algorithm Modes of Operation", Jul. 29, 1998, 102 pages.

* cited by examiner

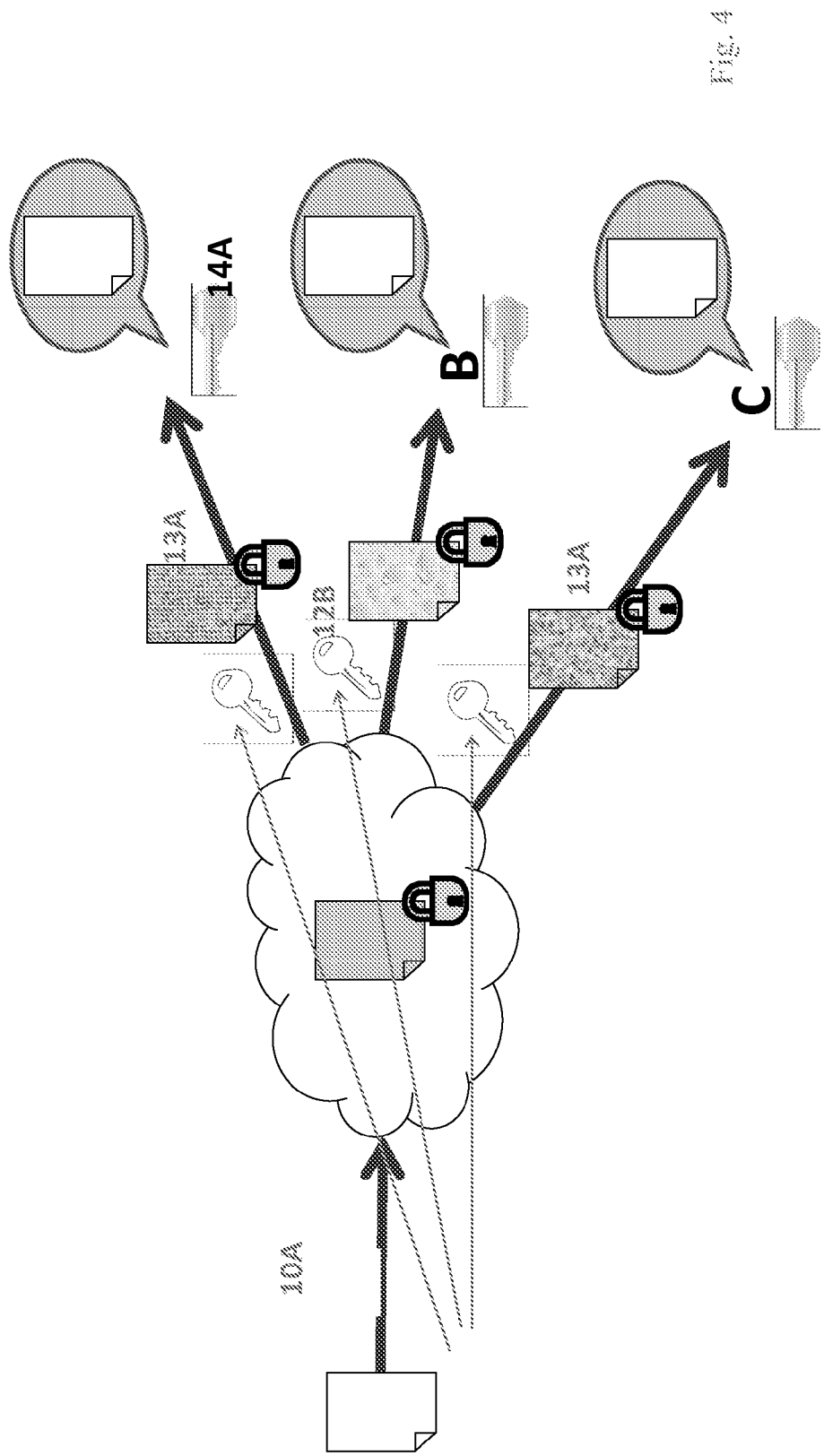

SYSTEM FOR PROTECTING AN ENCRYPTED INFORMATION UNIT

CROSS-REFERENCE TO RELATED APPLICATIONS

This application claims priority from and incorporates by reference the entire disclosure of U.S. Provisional Patent Application No. 61/405,302, which was filed on Oct. 21, 2010.

The present invention relates to a system for protecting an encrypted information unit, the information unit being encrypted by applying an encryption key on the information unit. A chosen number of system users have encryption subkeys, and the system comprising a calculation means for calculating the encryption key from encryptions subkeys provided by said users based on a predetermined mathematical function.

While encryption of information is well known a problem arises when several people have different roles in distributing and sharing the information.

Several different solutions are described in the cited publications where RFC 3851 [7] and RFC 2634 [4] defines the wrapping of secure emails. The wrapping allows a piece of data to be signed/encrypted multiple times in any combination. For example, a piece of data can be encrypted two or three times. In this case, the wrapping mechanism as follows. Let a message m be first encrypted into an encrypted message $m_1$. $m_1$ is then used to construct a new piece of data, $m_{e1}$, of a specific data structure, called, Enveloped Data. Then $m_{e1}$ is treated as a data block and encrypted again as $m_2$. $m_2$ will then be used to construct $M_{0e2}$ of the Enveloped Data data structure. This operation can be performed repeatedly. This is in fact not a way of re-encrypting a piece of data. Instead, it is only a way of packing encrypted data using the same data structure. There is no way to decrypt the double/triple wrapping encrypted data in a single decryption. There is no way to encrypt a piece of data in a single encryption to produce a double/triple wrapping encrypted data.

Zhao et al. [9] proposed a distributed key management scheme based on RSA encryption. The proposed scheme allows a RSA key be split into multiple shares. Each entity holds one of the shares. If all of them work on the same plaintext for encryption, a ciphertext can be generated, which is the same as the ciphertext produced by encrypting the plaintext using the original RSA key. Similarly, if all of them work on the same ciphertext for decryption, a plaintext can be produced, which is the same as the plaintext produced by decrypting the ciphertext using the original RSA key. The difference between Zhao et al.'s scheme [9] and the scheme proposed by the present invention is that, for encryption, Zhao et al.'s scheme [9] needs to work on the plaintext, and it is based on the RSA algorithm. The scheme proposed by this work needs only to work on the plaintext initially, and all further encryption will be applied on the previously produced ciphertext.

3DES [1, 5, 6] is a scheme proposed to enhance the security of DES (Data Encryption Standard) algorithm. It works by encrypting a piece of data using DES with the key $k_1$, then decrypting the previous result using DES with the key $k_2$, and finally encrypting the previous result using DES with the key $k_3$. When $k_1$, $k_2$ and $k_3$ are all independent and different, the security of 3DES can be improved to the level of having the key length of 168 bits, much greater than the original key length of DES, which is 56 bits.

Threshold cryptography [8] proposed by Shamir is a cryptography scheme based on secret sharing. It shares the encryption/decryption secret among n users, with each user keeping only part of the secret. The scheme allows any k or more users out of the n users to cooperate together to perform encryption/decryption operations. The operations will have the same effect as using the complete secret. When k is set to n, threshold cryptography is very similar to the scheme proposed in this paper. But threshold cryptography, depending on the specific implementation and schemes, is likely to require to work on the plaintext and interactive and complicated communication among the participating users. The scheme according to the present invention does not require interactive communication among the participating users.

Homomorphic encryption is a cryptography scheme that, by applying algebraic operations on the ciphertext, one can perform algebraic operations on the plaintext. This allows multiple parties to cooperatively generate a piece of ciphertext without knowing the plaintexts that others work on. The process can be formalized as follows. Let e be an encryption function and $m_1$ and $m_2$ be two plaintext.

$$c_1 = e(m_1)$$

$$c_2 = e(m_2)$$

$$c_1 \times c_2 = e(m_1 + m_2)$$

where × and + are two algebraic operations.

Homomorphic encryption differs from the scheme according to the present invention in that it investigates the algebraic relationship between the algebraic operations on plaintext and the algebraic operations on ciphertext. The scheme according to the invention is to investigate the relationship between the algebraic operation on the cipertext and the algebraic operations on the encryption keys. Incremental encryption [2, 3] proposed an incremental cryptography scheme. The scheme allows the computation of the final ciphertext based on the initial ciphertext and the change of the plaintext. To be specific, let m be a plaintext, the initial ciphertext be $c = f(m, k)$ where k be the encryption key. If m is modified to $m + m_\delta$, the final ciphertext $cf = f((m + m_\delta), k)$ can be computed as $cf = g(c, h(m_\delta, k))$, where h is a function that calculates the effect of the change of the plaintext, and g is a function that calculates the final ciphertext based on the effect of the plaintext change and the initial cipheretext. Thus according to this scheme the users will still be able to use the original key to decrypt the ciphertext, which limits the value of the scheme. It is an object of the present invention to provide a system where the keys may be changed without altering the ciphertext, and where if one encryption key is changed other users will have to have new encryption keys in order to decrypt the information.

Another example of known methods is shown in US patent application 2009/0116649, which relates to a system based on secret sharing and threshold cryptography. Data in this case is protected by first encrypted into ciphertext and then split into a number of pieces. If a user can have access to a certain number of the pieces, where the number is greater than a pre-determined number, the user will be able to reconstructed the original ciphertext and then obtain access to the ciphertext.

If access privilege is changed, the solution described in US2009/0116649 needs to "re-encrypted" the electronically stored information. The "Re-encryption" means requires the application an encryption on the plaintext for a second time, which is independent from the first encryption such that both the first encryption and the second encryption ("re-encryption") are applied to the plaintext. Changing access privilege requires the removal of the original keys and the execution of a new encryption, while changing access privilege requires only issuing new keys to a user, or removing an existing data stored on the server. Also, in US2009/0116649 all users obtain the same set of data, but they have access to different subset of the data.

It is an object of the present invention to provide a solution where specific users may be given access without re-encrypting or otherwise altering the encrypted information unit and without changing the users keys e.g. if access is to be changed.

Other known solutions are discussed in US2006/012713 and US 2009/0249060 where the former relates to a solution for personal information protection using access codes, and the latter discuss a group key scheme where users are organized in groups being allocated with different access privileges. Thus the persons in each group has access to the groups.

More specifically present invention relates to a system where the encryption key can be latterly changed without decrypting or re-encrypting the encrypted information or knowing the encryption key and the system comprising a decryption unit being adapted to receive the encryption key part from each user. Thus a group of users can work together to comprise an encryption unit. Each of the users applies an encryption on the information using his/her key part in such a way that the first user applies the encryption on the original information, where all others apply the encryption on the information processed previously. The final result is a piece of information that has been applied the encryption using the key part of every user in the group. The final encryption key of the information unit can be computed based on the encryption keys that have been applied to the information unit. This is obtained in a system according to the invention as specified in the independent claims.

The present invention is based on the progressive encryption scheme (ECC) which is based on the Elliptic Curve Cryptosystem (ECC), which means that it is possible to encrypt a piece of data several times using different keys, and the encrypted data can be decrypted by in a single decryption process using a single key. The data encryption is repeated in several rounds with different keys. Except for the first encryption that is based on the plain text of the data, all the consequent encryption operations are based on the encrypted data produced by the previous encryption operations. As mentioned above the present invention also gives an advantage that the keys may be changed without changing the ciphertext but requiring that a new set of keys are distributed among the users.

BRIEF DESCRIPTION OF THE DRAWINGS

The invention will be described below with reference to the drawings illustrating the invention by way of example.

FIG. 4 illustrates a cloud based system where a publisher encrypts an information unit using a key and makes the encrypted information publically available.

DETAILED DESCRIPTION OF THE PREFERRED EMBODIMENTS

Figure 1:
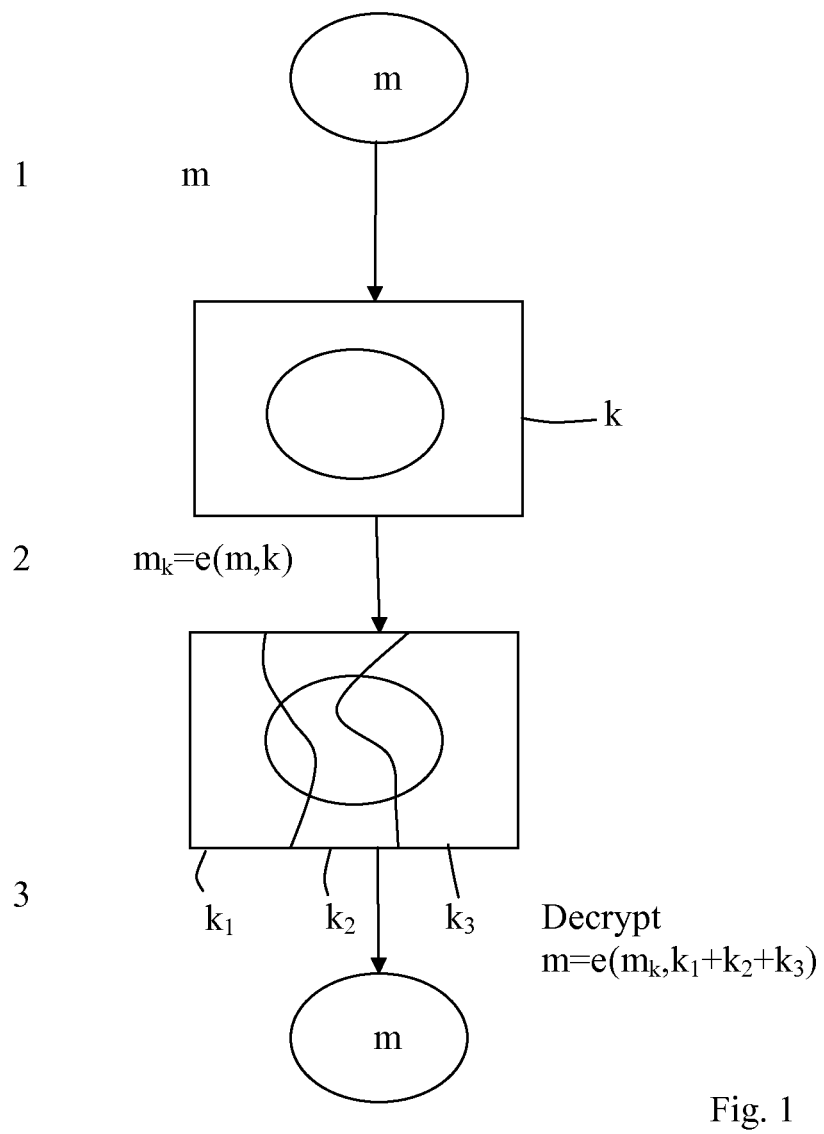
FIG. 1 illustrates the invention schematically.

As illustrated in FIG. 1 the general idea of progressive encryption is to provide a sequential encryption process where the information is decrypted when the sequence is ended. The information being encrypted may be of several different types, and although the phrase ciphertext is used described the information any defined unit of information is to be understood as being included. The information unit may thus being constituted by any information relating to e.g. text strings, numbers, images, music or movies.

According to some embodiments the order of the applied keys may be commutative so that the user does not have to apply their keys in a specific order. In other cases a specific order may be required so that an additional security is provided. The encryption process is a form of encryption that one can perform an algebraic operation on the encryption key by applying an algebraic operation on the ciphertext or information unit.

Referring to FIG. 1 the information unit m is encrypted in step 1 by applying the first encryption key k containing the encrypted information unit/ciphertext m. The second step 2 involves a sequence where in the illustrated example 3 preferably different second encryption keys $k_1$, $k_2$, $k_3$ are applied. Preferably the second encryption keys are commutative but in some cases where a specific order of the users is required they should be applied in a predetermined order. Each new key applied to the ciphertext encrypts it further but the encryption keys are chosen so that when the last of the second encryption keys has been applied it will work as a decryption key, leaving the information unit open. Thus the process is actually to change the encryption key k, into $k+k_1$, then $k+k_1+k_2$, and so on. The final key $k_n$ will have to make sure $k+k_1+k_2+\ldots+k_n=0$. Thus if a piece of information is encrypted with k first, then re-encrypt with $k_1$, then $k_2$, until $k_n$. The final result will be the clear text again. Key splitting of k into $k_1, k_2, \ldots, k_n$, is to make sure that $k+(-k_1)+(-k_2)+\ldots+(-k_n)=0$, hence the encrypted text is decrypted.

Therefore, in the following text the phrase "encryption key" is ambiguous as the last of the encryption keys is in effect the decryption key, cancelling the encryption obtained by the previously applied keys and restoring the information unit in a decrypted form.

More in detail the key ideas are as follows:
Encryption k is applied on ciphertext m. Encryption is equivalent to changing the encryption key. Let an encryption process be donated as e(m,k) where e is the encryption function, m is the data to be encrypted and k is the encryption key. Progress encryption can be formalized as follows.

$$e(m,k_1+k_2)=e(e(m,k_1),k_2)$$

where + is an algebraic operation.

Let a piece of clear text, m, be encrypted with the key $k_1$ using the encryption function e. Let the encrypted text be $m_1=e(m,k_1)$. If $m_1$ is encrypted again using the encryption function e with the key $k_2$, it will produce a new encrypted text $m_2=e(m_1,k_2)$. According to the definition of Progress encryption, $m_2=e(m, k_1+k_2)$. This is to say, if m is doubled encrypted with two keys, $k_1$ and $k_2$, it will be the same as m be encrypted with $k_1+k_2$.

It is obvious that, when a message m is triply encrypted with the keys $k_1$, $k_2$, and $k_3$, the final ciphertext will be the same as the ciphertext of the encryption of m with the key $k_1+k_2+k_3$. The whole computation can be described as follows.

m be encrypted with the key $k_1$, such that $m_{e1}=e(m,k_1)$.
$m_{e1}$ is encrypted with the key $k_2$, such that $$\begin{align} m_{e2} &= e(m_{e1}, k_2) & (1)\\ &= e(e(m, k_1), k_2) & (2)\\ &= e(m, k_1+k_2) & (3) \end{align}$$

$m_{e2}$ is encrypted with the key $k_3$, such that $$m_{e3} = e(m_{e2}, k_3) \quad (4)$$
$$= e(e(m, k_1 + k_2), k_3) \quad (5)$$
$$= e(m, k_1 + k_2 + k_3) \quad (6)$$

When the algebaric operation + is commutative, different orders of the encryptions with the keys will result in the same ciphertext.

Let m to be encrypted with $k_1$ and $k_2$. This can be done in the following two different orders.

m is encrypted with $k_b$, followed by the encryption with $k_2$.

$$m_1 = e(m, k_1) \quad (7)$$
$$m_2 = e(m_1, k_2) \quad (8)$$
$$= e(e(m, k_1), k_2) \quad (9)$$
$$= e(m, k_1 + k_2) \quad (10)$$

m is encrypted with $k_2$, followed by the encryption with $$m'_1 = e(m, k_2) \quad (11)$$
$$m'_2 = e(m'_1, k_{1»}) \quad (12)$$
$$= e(e(m, k_2), k_1) \quad (13)$$
$$= e(m, k_2 + k_1) \quad (14)$$

When the algebraic operation + is commutative, $k_1+k_2=k_2+k_1$, thus $e(m, k_1+k_2)=e(m, k_2+k_1)$, therefore, $m_2=m_2'$. Hence the order of the encryption will not affect the final ciphertext.

The algorithm of conventional ECC encrypts the data m to the user w, who has the private key $k_w$ and public key $k_w G$ as follows.

1. A random number r is picked.
2. Calculate $m_c = m + r k_w G$
3. Calculate $k_r = r G$ Then the message $(m_c, k_r)$ is sent to the user w.

On receiving the message $(m_c, k_r)$, the user w decrypts the message as follows.

1. Calculate $p = k_w k_r = k_w r G = r k_w G$.
2. Calculate $m_p = m_c - p = (m + r k_w G) - r k_w G = m$.

The algorithm of progressive ECC works in as follows.

Let m be a piece of data, U be a set of users. Let $u_i \in U$ have the secret key $k_i$.

Let $m_0 = m$ and let q be a random number agreed by all $u_i \in U$. The encryption is performed in the order of $u_1, \ldots, u_n$.

For $u_i \in U$, it computes $$m_i = m_{i-1} + q k_i G$$

When all $u \in U$ has participated in the encryption process, the encrypted data is as follows.

$$m_e = m_i \quad (15)$$
$$= m_0 + \sum_{i=1}^{n} (q k_i G) \quad (16)$$
$$= m + \sum_{i=1}^{n} (q k_i G) \quad (17)$$

Let $k_s = \Sigma_{i=1}^n k_i$, then $m_e$ can be decrypted by a single operation as follows.

$$m_p = m_e - q k_s G \quad (18)$$
$$= m_e - q \sum_{i=1}^{n} k_i G \quad (19)$$
$$= m_e - \sum_{i=1}^{n} (q k_i G) \quad (20)$$
$$= m \quad (21)$$

Thus the user can obtain the plain text m. The user decrypts the encrypted text $m_c$ in a single operation, though $m_c$ is produced by two encryption operations. Thus progressive ECC can be used to provide the following features.

Linking a set of users all together for a specific transaction or a specific operation. The final decryption successes only when the encryption process is completed with all the required encryption operations performed by each individual user in U. If one or more users have not performed the encryption operations, the decrypted text will be different from the plain text, meaning the decryption process will fail. Thus all users in U will have to work together.

Imposing access control using keys. Receivers are given different keys for decrypting the encrypted content. The content is encrypted by using different combination of the users in the set U, to allow different receivers with decryption keys to have access to different content.

Implementing digital right management. Progressive ECC can be used to implement DRM systems. Each player has been allocated with a private key. Media files are distributed in encrypted forms to resellers. When a user purchases a media file, the encrypted media file will then be re-encrypted again. The reencrypted media file is then can only be decrypted by the user's media player. This process protects the media files both when they are distributed to resellers and when they are played by users.

Applications of the System According to the Invention

A first possible embodiment is related to multiple person binding. There are systems where they need to impose a very high level of security by requiring multiple persons to operate at the same time. Unless all the bound persons collude together, otherwise, the system won't be broken into.

A possible scenario is the central bank depot. The central bank depot keeps a large amount of cash and gold for the central bank. The security system of the depot must ensure the security of all the valuables in side the depot. The entrance could be guarded by a system that requires three different manager's authorization, including the bank manager, the depot manager, and the security manager. In this case, the system can be implemented as follows.

Let the depot security system has a private key k. The private key k is splitted into three shares, $k_b$, $k_d$, and $k_s$, where $k = k_b + k_d + k_s$. Then, $k_b$, $k_d$, and $k_s$ are given to the bank manager, the depot manager, and the security manager as their private keys.

To prove that a person Chris has been granted the permission from all the three managers, Chris will need to have all the three manage to encrypt a given message m using their private keys in turn.

1. A random number r will be generated and agreed by all three bank managers.

2. The bank manager will first encrypt the message m using r and its private key $k_b$ to produce $m_b$, such that $m_b=m+r\,k_b\,G$.
3. The depot manager will then encrypted the message produced by the bank manager, resulting $m_d=m_b+r\,k_d\,G$.
4. The security manager will finalize the encryption based on $m_d$ such that $m_s=m_d+r\,k_s\,G$.

The final output of the Progressives ECC encryption is $m_s$ where $$m_s = m_d + rK_sG \quad (22)$$
$$= m + r(k_b + k_d + k_s)G \quad (23)$$
$$= m + rKG \quad (24)$$

According to the Progressive ECC encryption scheme presented in Section 3, $m_s$ can be decrypted by the security system with its private key k and the public information rG as follows.

$$m_p = m_s - krG \quad (25)$$
$$= (m + rkG) - krG \quad (26)$$
$$= m \quad (27)$$

In this way, the security system binds the three managers together for authorizing user's access to the depot. Without the need of changing the security system's private key k, another group of persons can also be bound together for authorizing users. This new group's members will not be able to work with the three managers, as they are not within the same binding.

A second embodiment of the invention is related to access control for P2P video streaming. P2P Video streaming has been a new trend of distributing real time video to large set of users over the Internet. A serious concern is the access control over the receiving of the video stream. Existing solutions including using group keys, etc, to impose access control.

Progressive ECC can be used to implement the access control by using Progressive ECC to distribute encrypted content. The scheme is as follows.

Users are organized in different groups. Each group will be given a unique key for its group member to decrypt encrypted content. The video stream using a symmetric key $k_s$, which will be change from time to time. The symmetric key $k_s$ is then be distributed to all the authorized groups to allow the group members to access the encrypted contents. Members can be added and removed from a group without affecting other groups.

Figure 2:
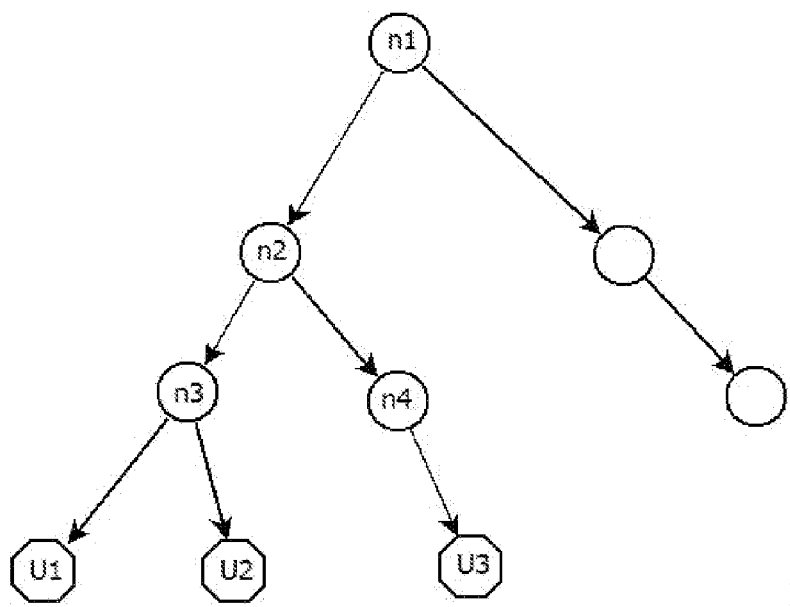
FIG. 2 illustrates one possible use of the invention.

As shown in FIG. 2 all groups are organized as leafs of a tree. Each non-leaf node has an individual private key for performing the Progressive ECC encryption. Each group member will has its group key to decrypt the encrypted information.

Let nodes $n_1$, $n_2$, $n_3$, and $n_4$ are 4 non-leaf nodes with private key $k_1$, $k_2$, $k_3$, and $k_4$. Users $u_1$ and $u_2$ belongs to group one with the key $k_{g1}=k_1+k_2+k_3$, user $u_3$ belongs to group two with the key $k_{g2}=k_1+k_2+k_4$.

The symmetric key $k_s$ will be progressively encrypted to group one by the nodes of $n_1$, $n_2$, $n_3$, and $n_4$, and then will be decrypted by $u_1$, $u_2$ and $u_3$ with the group keys of $k_{g1}$ and $k_{g2}$.

In the case that $u_2$'s authorization expires and he needs to be removed from the authorized user set to stop him from receiving any more video streaming, a new private key $k_3'$ will be delivered to node $n_3$ and a new group key $k_{g1}'$ will be delivered to user $u_1$. With these changes, $u_1$ can continue to receive video streams and $u_2$ won't. This change will not affect other users and other nodes, such as $n_1$, $n_2$, $n_4$ and $u_3$.

A third embodiment of the invention is related to DRM for Media File Distribution. Media files, such as songs and movies, are bought from the Internet and played on portable players and may be copied and shared. These media files no longer require any physical medium to deliver to the end users. Instead, most of them now are transferred and kept electronically.

One concern from the industry regarding to this trend is to keep control on the sharing of these media files that are kept by the end users, and the media files kept by the distributors. A general process of the media files from the producers to the end users are normally as follows.

1. Media producers make those media files.
2. Media files are delivered to resellers/distributors.
3. End users buy the media files from the resellers/distributors.

To protect the media files it is necessary to protect the media files being sold/distributed to end users with the authorization of the media producers. To provide the above protection, the media producer encrypts the medial file with a secret $k_p$ and sends the media file to the distributor/reseller. As the media file is encrypted, the distributor/reseller can not distributes/sells the media file. When a user Alice with the private key $k_a$ buys the media file from the distributor/reseller, the distributor/reseller requests the producer for authorization. The producer replies with $k_r$ and $k_u\,G$ to the distributor/reseller. The producer will keep $k_u$ secret and associate it with Alice's private key $k_a$. The distributor/reseller can then encrypt the encrypted media file again with $k_r$. The re-encrypted media is delivered to Alice with the decryption secret $k_u\,G$. Alice can use her private key $k_a$. This can be articulated as follows. Let the media file be m.

1. The media producer encrypts m to $m_p=m+k_p\,G$.
2. The reseller requests the media producer for authorization to sell the media file to Alice.
3. The media producer replies to the request with $k_r$ and $k_u\,G$, where $k_p+k_r=k_u\,k_a$. $k_u$ is kept secret by the media producer, hence $k_p$ can not be computed by the reseller.
4. The reseller re-encrypts $m_p$ to $m_a=m_p+k_r\,G$.
5. Alice receives $m_a$ and $k_u\,G$ from the reseller.
6. Alice's player can decrypt $m_a$ with the private key $k_a$ as follows.

$$m' = m_a - k_ak_uG \quad (28)$$
$$= m + k_pG + k_rG - k_ak_uG \quad (29)$$
$$= m \quad (30)$$

In this way, the media producer can encrypt a media file once and send it to all resellers. The media file can be sold to any consumer only with the authorization from the media producer. The media file delivered to the consumer can only be decrypted by the consumer.

In the terms of business, the media producer can sell the media files via resellers. It will not be possible for the reseller to decrypt the media file so as to protect it from malicious resellers. All selling must obtain individual authorization from the media producer, thus resellers will not be able to cheat on sale. The media file can only be decrypted by the specific consumer only, thus no illegal sharing is possible.

Yet another embodiment of the invention is related to critical token forwarding. It is common that one needs to send over a credential to an intermediate party for completing a transaction. A good example is, when booking hotels online, where it is required to pass credit card numbers etc to the booking website. As the booking website will take a record of the credit card numbers etc, potentially the booking website can abuse the private data for other purpose. There is no way to make sure that the recorded information will not be used for other purpose other than the original transaction if no protection is imposed on the private data.

Another issue is single sign-on systems, when a user application logon, the authentication server must return a token that can be used by the user only. Otherwise, if the token is stolen when it is in transfer in the network, other users can masquerade the user and have illegal access to the resources.

Both of the above two issues can be tackled by the progressive ECC, by having the intermediate node (the booking site in the first example, and the user in the second example) to join the encryption process in the Progressive ECC. The final encrypted text should be an encrypted text that can be decrypted by the final node (the bank in the first example, and the resources in the second example).

Take the first example illustrating this embodiment, let a user have the private key $k_u$ and the public key $k_u G$, a booking site have the private key $k_s$ and the public key $k_s G$, and the bank have the private key $k_b$ and $k_b G$. To protect its credit card number n, the user will generate a token as follows.

$$t_u = n - k_s G r_s + k_b G r_b \quad (31)$$

where $r_s$ and $r_b$ are two random numbers.

$t_u$ and $r_s G$ will then be delivered to the booking site. The booking site will continue the Progressive ECC as follows.

$$t_s = t_u + k_s r_s G \quad (32)$$
$$= n + k_b G r_b \quad (33)$$

$t_s$ and $r_b G$ are then be delivered to the bank. The bank decrypts the token as follows.

$$t = t_s - r_b G k_b \quad (34)$$
$$= n + k_b G r_b - r_b G k_b \quad (35)$$
$$= n \quad (36)$$

Yet another embodiment of the invention is related to trusted computing. Trusted computing is aiming at providing trusted and reliable computation. Trusted computing can be built on hardware or software. One of the challenges of trusted computing is to prevent short-circuit of the critical components that verify or enforce the security of the systems.

One of the way to impose protection of systems is to protecting the bindings between components, thus each component can have a trusted way to identify if any of the components that it interacts with has been removed or changed or not. For example, each transaction includes a sequence of components responsible for handling the data. If one or more components are missing from a transaction, it may be assumed that the system has been tampered with.

For example, the finger print scanner is a critical component for the automatic immigration control systems at airports. If the scanner is replaced by a fake device that provides finger print information without actually scanning a finger, the automatic immigration control systems will be compromised.

Figure 3A:
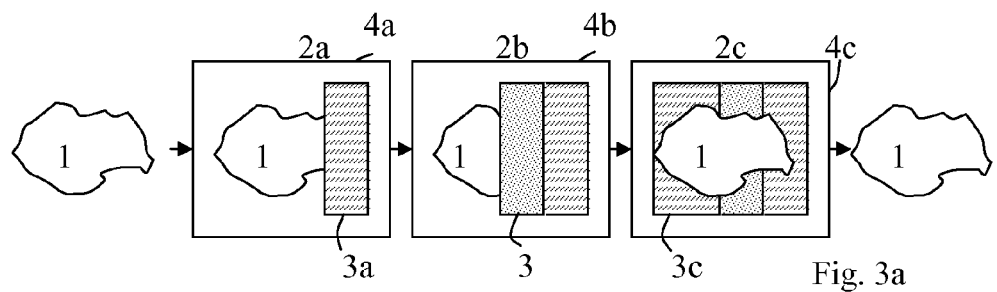
FIG. 3a,b illustrate systems according to the invention.
Figure 3B:
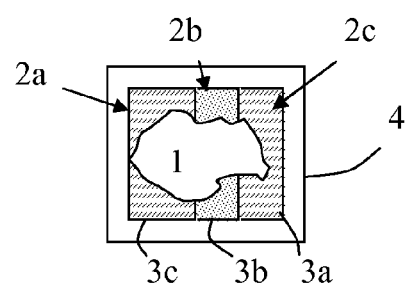

Thus to summarize with reference to FIGS. 3a and 3b the invention relates to a system for securing an information unit 1. The system comprises at least one encrypting means 4,4a, 4b,4c for applying a first encryption key 3a to the information unit 1 thus provided an encrypted information unit. In FIG. 3a each user 2a,2b,2c have their own encryption means 4a,4b, 4c, respectively and forward the encrypted information unit to the next user. With reference to the description above this may correspond to a record company 4a selling music through a reseller 2b to a consumer 2c, where the last encryption key 3c from the consumer 2c serves to decrypt the information unit 1 constituting the music and related information.

Referring to another embodiment illustrated in FIG. 3b one encryption means 4 is provided, e.g. in a central computer. The encryption means will encrypt the information each time one of the users 2a,2b,2c provide their encryption key 3a,3b, 3c. A decrypted information unit is obtained when all of the keys have been applied. In this case first key 3a may be the first encryption key applied beforehand so as not to storing the open information unit 1 before the process has started.

The communication between the users and/or the central computer may be by any available means such as internet or telephone net, and the encryption means may be included in available computers, mobile phones etc depending on the application of the invention as will be discussed below with reference to FIG. 4.

Thus the encryption means is adapted to apply at least two second information encryption keys 3a,3b,3c to the encrypted information unit 1, where the encryption keys have been calculated as described above so as to decrypt the encrypted information unit when all of said first and second encryption keys have been applied to the information unit. The encryption keys being distributed to chosen users of the system and this way all of the keys are needed to decrypt the information unit but the sequence of the application of the keys is preferable unimportant.

In one embodiment of the invention the encryption means are, as illustrated in FIG. 3b positioned in a central computer being adapted to received the encryption keys from a predetermined number of users, where the second encryption means are comprised in a encryption unit in the central computer being adapted to receive encryption keys from at least two users, the encryptions keys being applied to the encrypted information unit so as to decrypt the information unit. The combination may either be performed before the application of the code on the ciphertext, thus applying a combined key, or information unit or in a sequence.

Preferably however the system includes several encryption means 4a,4b,4c distributed among the users, the encryption means being adapted to apply in a sequence the second encryption keys to the encrypted information unit. The information unit thus being decrypted at the application of the last second encryption key but the order of the application of the encryption keys is unimportant.

FIG. 4 illustrates a so-called cloud based system where a publisher 10 encrypts an information unit using a key 10A and makes the encrypted information publically available, e.g. on the internet or a central database 11. If user A,B,C having a personal key 14A,14B,14C asks for a permission to see the information the publisher 10 may use a second decryption key 12A,12B,12C so that the encryption of the information unit 13A,13B,13C is adapted to be decrypted when subject to the personal decryption key 14A,14B,14C of the specific user. The second encryption key may provide permission for the user A,B,C to see only part of the information unit and if a user tries to apply an unauthorized personal second encryption key the information will not be decrypted. Thus a sequence of the first encryption key 10A with a first second encryption key 12B with a personal second encryption key 14C will result in a further encrypted information unit.

This way restricted information may be available on a secure database including such information as patients' medical journal, personal information portals or net traffic storage. Social sharing may be possible through the cloud for example including privacy control on multimedia published in the cloud. Examples of such use are digital merchandise selling through vendors, selling software, music, movies, games through online stores.

Thus the solution provides advantages by making it possible to publish encrypted data securely stored in with a cloud storage provider. The system may be operated by letting the user request data using their name (e.g. email). The publisher then approves each viewer by giving the cloud storage provider the second step encryption key 12A,12B,12C. Each user has a private key which may be used for all decryptions, such as a credit card number or other information being valuable and traceable so that the user has no reason for sharing it with others. No key distribution is needed for user side except the initial provision of private key.

The different uses of the system may include a system giving access to a secured area, e.g. a bank depot, the encryptions keys being provided by a predetermined number of persons to a central computer having the encryption means. The combination of the encryption keys, and possibly an initial first encryption key, is required to obtain the information unit needed to gain access. The encryption keys may be provided by the users through standard terminals by writing text and/or number strings, using codes implemented in smart cards or other similar means connected to the computer and encryption means using available communication protocols which depend on the system and will not be described in detail here.

Another use of the system may, as mentioned above, be in a situation where the encrypted information unit is a media stream comprising a combination of different streams each encrypted with different encryption keys. The stream provider provides at least one encrypted stream, a first subgroup having encryption means provides a first encryption key and at least one subgroup having another encryption means and key provides a second encryption key, the combination of keys decrypting the relevant media stream. In this case the keys only opens the part of the information unit allowed by the stream provider and thus a stream provided through another route or to another end user may open different information.

In yet another use of the system according to the invention the encrypted information unit is a media file and the encryption keys are provided by at least one reseller of said file having an encryption means and an encryption key, and at least one customer of said reseller having another encryption means and encryption key, the file thus being decrypted by the combination of second encryption keys from a authorized reseller and a customer. In some cases the seller or unit that encrypted the information may provide access for the buyer or receiver of the information by applying a suitable first key thus in effect allowing the user to unlock the information as his or her key is the remaining keys necessary for encrypting the information.

A further use of the system according to the invention is in combination with personal identification, e.g. related to a credit card, for economical transactions wherein the information is encrypted by the card owner having the first encryption means and encryption key. The information encrypted by buyer is sent to the seller who uses a second encryption means applying a second encryption key and may include additional information such as information about the sale to the message transmitted to the bank. The bank transfers the payment after encrypting the information using their encryption means and key thus revealing the credit card information which has been hidden for the seller, and thus is able to transfer the payment from buyer to seller.

REFERENCES

[1] ANSI. ANSI X9.52 Triple Data Encryption Algorithm Modes of Operation, 1998.

[2] Mihir Bellare, Oded Goldreich, and Shafi Goldwasser. Incremental cryptography: The case of hashing and signing. In *CRYPTO '94: Proceedings of the 14th Annual International Cryptology Conference on Advances in Cryptology*, pages 216-233, London, UK, 1994. Springer-Verlag.

[3] Mihir Bellare, Oded Goldreich, and Shafi Goldwasser. Incremental cryptography and application to virus protection. In *STOC '95: Proceedings of the twenty-seventh annual ACM symposium on Theory of computing*, pages 45-56, New York, N.Y., USA, 1995. ACM.

[4] P. Hoffman. RFC 2634—Enhanced Security Services for S/MIME. Request For Comment, Network Working Group, June 1999.

[5] International Organization for Standardization. ISO/IEC 18033-3 Encryption algorithms—Part 3: Block ciphers, 2005.

[6] National Institute of Standards and Technology. NIST Special Publication 800-67 v1.1: Recommendation for the Triple Data Encryption Algorithm (TDEA) Block Cipher, May 2008.

[7] B. Ramsdell. RFC 3851—Secure/Multipurpose Internet Mail Extensions (S/MIME) Version 3.1 Message Specification. Request For Comment, Network Working Group, July 2004.

[8] Adi Shamir. How to share a secret. *Comm. ACM*, 22 (11), 1979.

[9] Gansen Zhao, Sassa Otenko, and David Chadwick. Distributed key management for secure role based messaging. In *Proceeding of The IEEE 20th International Conference on Advanced Information Networking and Applications (AINA2006)*, Vienna, Austria, April 2006.

The invention claimed is:

1. A system, comprising:
a first node, a second node, and an intermediate node, the first node, the second node, and the intermediate node each comprising an electronic computing device configured to encrypt data using an Elliptic Curve Cryptography (ECC) encryption scheme and to handle a respective private key and public key for the ECC encryption scheme, the ECC encryption scheme defined by a base point (G) on an elliptic curve,
the system being configured to secure a data unit during a transfer from the first node to the second node via the intermediate node, wherein:
the electronic computing device of the first node is configured to encrypt the data unit using the ECC encryption scheme and $k_pG$ derived based on the private key of the first node and a random number, and to send the encrypted data unit to the intermediate node,
the electronic computing device of the intermediate node is configured to receive a request for the data unit from the second node, the request comprising the public key of the second node, and in response to the request send a further request to the first node for authorization to transfer the data unit to the second node, wherein the further request comprises the public key of the second node, the electronic computing device of the first node is configured to derive $k_r$ and $k_u G$ satisfying the equation $k_p+k_r=k_u k_a$, where $k_u$ is associated with the private key $k_a$ of the second node, and to send $k_r$ and $k_u G$ to the intermediate node in response to the further request, the electronic computing device of the intermediate node is configured to re-encrypt the encrypted data unit using the ECC encryption scheme and $k_r$, and to send the re-encrypted data unit and $k_u G$ to the second node, and the electronic computing device of the second node is configured to decrypt the re-encrypted data unit using the ECC encryption scheme and the private key $k_a$ of the second node.

2. A method, to be performed by a system comprising a first node, a second node, and an intermediate node for securing a data unit during a transfer from the first node to the second node via the intermediate node, the first node, the second node and the intermediate node each comprising an electronic computing device, the electronic computing device of each of the first node, the second node and the intermediate node configured to encrypt data, and the electronic computing device of each of the first node, the second node, and the intermediate node configured to handle a respective public-private key pair associated by a base point (G) for Elliptic Curve Cryptography (ECC), the method comprising:

the electronic computing device of the first node encrypting the data unit using the ECC encryption scheme and $k_p G$ being derived based on the private key of the first node and a random number;

the first node sending the encrypted data unit to the intermediate node;

the electronic computing device of the intermediate node receiving a request for the data unit from the second node, the request comprising the public key of the second node, and in response to the request sending a further request to the first node for authorization to transfer the data unit to the second node, the further request comprising the public key of the second node, the electronic computing device of the first node deriving $k_r$ and $k_u G$ to satisfy the equation $k_p+k_r=k_u k_a$, where $k_u$ is associated with the private key $k_a$ of the second node, and sending $k_r$ and $k_u G$ to the intermediate node in response to the further request, the electronic computing device of the intermediate node re-encrypting the encrypted data unit using the ECC encryption scheme and $k_r$, and sending the re-encrypted data unit and $k_u G$ to the second node; and the electronic computing device of the second node decrypting the re-encrypted data unit using the ECC encryption scheme and the private key of the second node.

3. The method according to claim 2, wherein the system is a DRM system, the encrypted data unit is a media file, wherein the first node is related to a producer of the media file, the intermediate node is related to a reseller of the media file, and the second node is related to a consumer of the media file.

4. The method according to claim 2,
wherein the intermediate node is related to a cloud storage provider, and
the method further comprising:
the intermediate node storing the encrypted data unit in a central database.

* * * * *